March 14, 1950     J. F. SEBALD     2,500,774
WATER TREATING METHOD AND APPARATUS Filed Aug. 3, 1946     2 Sheets-Sheet 1

Inventor
JOSEPH F. SEBALD

March 14, 1950     J. F. SEBALD     2,500,774
WATER TREATING METHOD AND APPARATUS Filed Aug. 3, 1946     2 Sheets-Sheet 2

Inventor
JOSEPH F. SEBALD

By Robt Meyer
Attorney

Patented Mar. 14, 1950

2,500,774

UNITED STATES PATENT OFFICE 2,500,774

WATER TREATING METHOD AND APPARATUS

Joseph F. Sebald, Bloomfield, N. J., assignor to Worthington Pump and Machinery Corporation, Harrison, N. J., a corporation of Delaware Application August 3, 1946, Serial No. 688,250

20 Claims. (Cl. 210—14)

This invention relates to a method and apparatus for treating water and more particularly to an improved hot process water softener of the slurry type for purification of boiler feed water or water for other uses wherein heated, deaerated or degasified purified water is required.

Primarily the present invention comprises a hot process water softener or purifier of the deaerating type in which the effluent from the primary heater; i. e. the vent condenser, is mixed with the incoming chemical or reaction agent in a restricted mixing chamber for preliminary chemical reaction from which it flows downward by gravity to the bottom thereof and discharges at increased velocity through a multiplicity of flow restricting spiral vanes to impart a rotative motion to the partly treated water to the underside of a floc bed or settling chamber. The partially treated water flows upward through the floc bed, which bed acts as an adsorptive type contact filter for the removal of fine floc particles and clarification of the treated water. The treated water passes upward above the floc bed through a steam jet deaerator, comprising an intimate mixing passage for the water and steam, for final deaeration or degasification and then passes to the storage chamber for treated water, from which it is taken for use or for passage through conventional pressure filters for complete clarification.

The invention of the present application comprises among other novel features:

Maintaining constant the upward flow of the partially treated water through the floc bed through complementary recirculation of treated water by means of suitable valves and a recirculation pump.

The material reduction of the retention time, of the water in the apparatus, necessary to produce a very low degree of hardness of the water and a high degree of silica removal by recirculation of precipitated sludge or floc through the apparatus, together with the utilization of the adsorptive properties of the floc bed through which the water passes.

The prevention of interference with the efficiency of operation of the apparatus by entering cold chemical liquid or reaction agent by spraying the incoming reaction agent through steam in the apparatus, thus heating the chemical or reaction agent to the temperature of the water with which it is mixed, and The increasing of the velocity of the mixture flowing downward by gravity through the initial mixing chambers at its entrance of passage through the flow restricting spiral vanes to keep the precipitated floc in suspension during flow of the mixture past the vanes.

With these and other objects in view, as may appear from the accompanying specification, the invention consists of various features of construction and combination of parts, which will be first described in connection with the accompanying drawings, showing a water treating method and apparatus of a preferred form embodying the invention, and the features forming the invention will be specifically pointed out in the claims.

Referring more particularly to the drawings the improved water treating apparatus comprises a treating receptacle 1 having a vent condenser 2 of any approved type associated therewith, through which vent condenser 2 the water to be treated passes from the raw water inlet line or pipe 3 prior to its entrance into the receptacle 1. The vent condenser serves to condense the steam not condensed in the receptacle 1, as will be hereinafter more specifically described, and provides a primary heating of the water to be treated.

Figure 1:
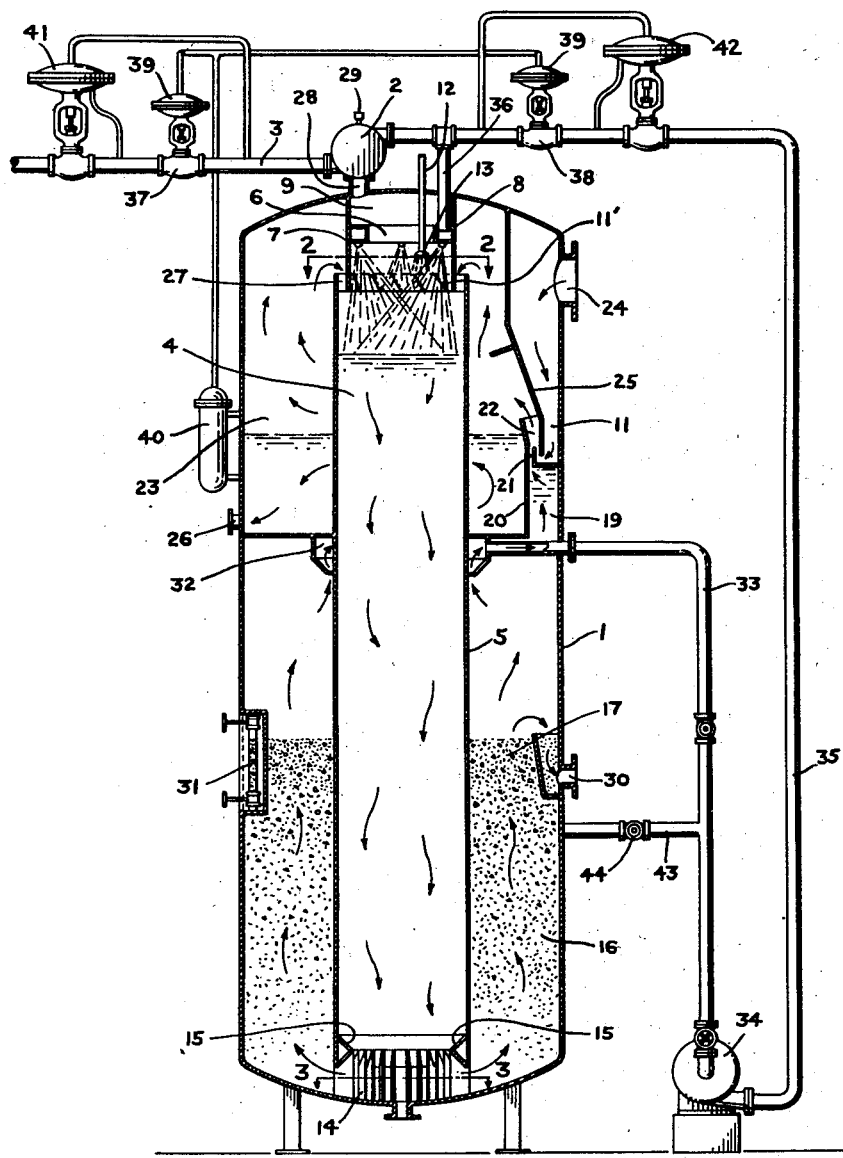
Figure 1 is a vertical section through the improved water treating apparatus.
Figure 2:
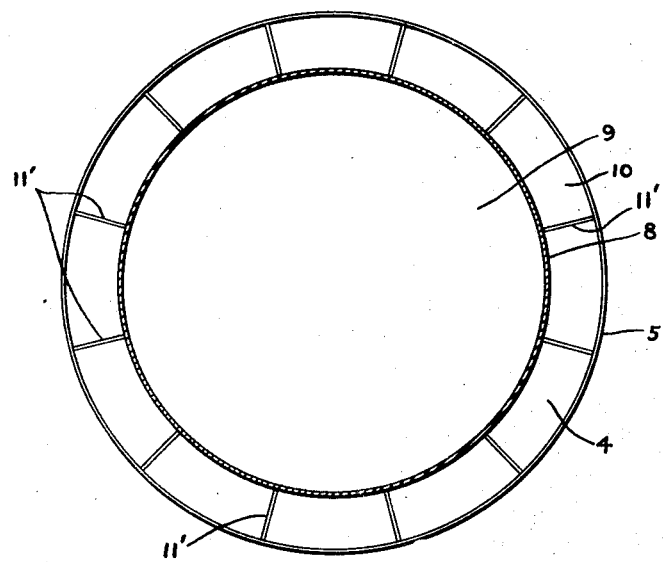
Figure 2 is a horizontal section through a part of the water treating apparatus taken on the line 2—2 of Figure 1.
Figure 3:
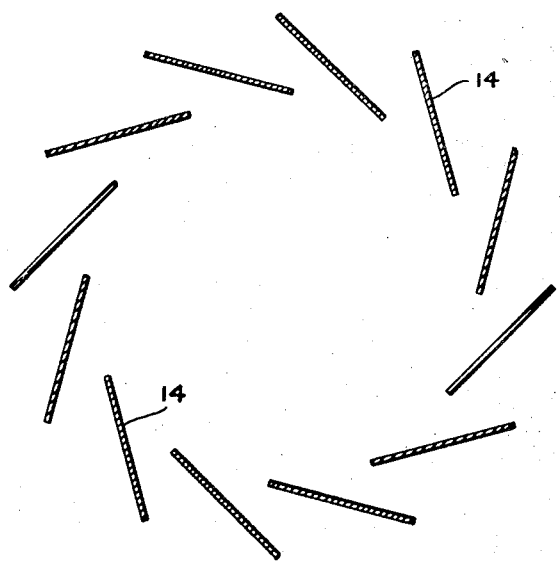
Figure 3 is a horizontal section, taken on the line 3—3 of Figure 1 and showing the arrangement of the flow restricting spiral vanes.

After passing through the vent condenser 2 the water to be treated is sprayed into the upper end of the mixing chamber 4. The reaction or mixing chamber 4 is formed by the cylindrical shell 5 and extends throughout the major portion of the height of the receptacle 1 as clearly shown in Figure 1 of the drawings. The incoming raw water is sprayed from the water ring 6 through spray nozzles 7 which are arranged at an incline to the vertical so that the angularity of the water flow from the nozzles 7 will cause the water to assume a circular path as it enters the reaction or mixing chamber 4. Nozzles of this type and for the same purpose are shown and described in my prior Patent Number 2,379,753, issued July 3, 1945.

An annular wall 8 forms an inlet contact chamber 9 through which the incoming water is sprayed and in which it first comes in contact with the steam in the apparatus, and this inlet contact chamber 9 and the upper end of the mixing chamber 4 above the level of water therein form the primary direct contact heating and deaerating space in the apparatus. As clearly shown in Figure 1 of the drawings the annular wall 8 extends a short distance downwardly into the mixing chamber 4 and leaves an annular space 10, open at the top, through which steam not condensed in the secondary heating and deaerating chamber 11 passes for direct contact with the incoming sprayed water. A plurality of vanes 11' are disposed in the annular space 10 and are disposed so as to direct incoming steam at an angle to impinge on incoming water, to supplement rotary mixing movement of the water.

The treating chemicals or reaction agent is sprayed into the contact chamber 9 through a suitable inlet pipe 12 having a spray nozzle 13 on its outlet end. Thus the incoming chemicals or treating agent is contacted by steam in the primary direct contact heating space and its temperature is raised to approximately the temperature of the water, thus eliminating the interference with the efficiency of operation of the apparatus which might be caused by the volume of incoming chemical lowering the temperature of the water and placing a higher burden of heating on the final heating and deaerating of the water.

The water and chemicals are thoroughly mixed by the rotative flow of the water and steam in the top of the mixing chamber, and the mixture flows downward by gravity through the full length of the mixing chamber 4. During this downward flow, foreign material in the water is precipitated in the form of floc.

A plurality of stationary spiral vanes 14 are carried by the receptacle 1 at the bottom of the mixing chamber 4, and the mixture of water, chemicals and precipitated floc flow through the flow restricting passages formed by the vanes 14, which owing to the configuration of the vanes 14 imparts a rotative motion to the partly treated water or mixture leaving the mixing chamber 4.

The outlet from the mixing chamber 4 into the passages formed by the vanes 14 is restricted or reduced by an annular inclined wall 15 so as to increase the velocity of the mixture at the entrance to the vane passages to keep the precipitated floc in suspension in the mixture.

The mixture passes upwardly with a gradually decreasing rotative motion through the settling chamber or space 16 in the receptacle 1, during which travel further precipitation of foreign material in the form of floc is provided. The precipitated floc forms a floc bed, indicated at 17 part way up the height of the settling chamber 16, and as the mixture passes through the floc bed 17 the particles of precipitated floc moving along with it through the settling chamber 16, are adsorbed into the floc bed, clinging to other particles of floc in the bed, so that the water emerges through the bed in a clean, clear, softened condition.

The treated water in the settling space or chamber 16, is subjected to a final heating and deaerating action by passing through the secondary and final heating and deaerating section 11.

The final heating and deaerating structure 11 comprises a water entrance chamber or space 19, formed by the partition 20, which space 19 is open at its bottom to the top of the settling chamber 16. The treated water passes upwardly through the entrance space 19, through the restricted passage 21 into the mixing passage 22 where it is thoroughly mixed with incoming steam. The thorough mixing of the steam and water in the mixing passage provides the final heating of the water, and as the mixture of steam and water are projected from the relatively confined mixing passage 22, into the relatively large space above the water level in the storage compartment or space 23, the pressure is reduced or relieved, resulting in the separating out of air or noncondensible gases from the water and providing the final stage of deaeration of the treated water.

The steam enters the receptacle 1 through a suitable steam inlet 24 and is guided by the baffle or wall 25 into the lower end of the mixing passage 22, where it mixes with the water, and acts as a motive agent to draw the water into and carry it through the mixing passage 22.

The water discharged from the mixing passage 22 falls downwardly into the storage or treated water space or chamber 23 from which it leaves through an outlet 26 for use or for passage through conventional type pressure filters (not shown) for complete clarification.

The steam which is not condensed during passage through the mixing passage 22 (which is the greater percentage of the steam entering the receptacle 1) together with the released non-condensibles, pass upwardly through the upper part of the chamber 23, through the annular space 27 about the annular wall 8 and into the primary heating and deaerating space formed in the top of the mixing chamber 4 and the entrance space 9 where it contacts the incoming sprayed water and chemical and provides the primary direct contact heating of them as well as the initial deaeration thereof.

Such steam as is not condensed by contact with the sprayed incoming water, together with non-condensing gases pass from the entrance chamber 9, through the connection 28 into the vent condenser 2, where the steam is condensed, and being condensed therein by exchange of heat with the incoming water, the non-condensing gases are released from the vapor mixture and pass to atmosphere through a suitable outlet indicated at 29.

Floc is drawn off from the top of the floc bed 17 through a suitable outlet 30, so as to maintain proper depth to the floc bed, and the depth of the floc bed can be ascertained by means of a sight glass 31, located so as to permit vision of the height of the floc in the chamber 16.

Because in use hot process water softeners or purifiers operate under varying load conditions, that is because the demand for treated water varies considerably during operation, and because if the quantity flow of water through the settling chamber 16 and the floc bed 17 varies materially the efficiency of the apparatus is adversely affected, the present invention includes means for maintaining constant, the quantity flow through the settling chamber 16 and floc bed 17.

This constant quantity flow means comprises a collection ring 32, located at the top of the chamber 16 and having an inlet at its bottom through which treated water flows into the ring 32. An outlet pipe 33 has communication with the interior of the ring 32 and leads water from the ring 32 to the suction of a recirculating pump 34. The pump 34 may be of any approved type. The recirculation water goes through the pipe 35 into the down pipe 36 and thence into the spray or water ring 6. The down pipe 36 also serves to deliver water from the vent condenser 2 to the ring 6.

Pressure actuated valves 37 and 38 are positioned in the raw water incoming pipe 3 and the pipe 35 respectively. These valves are of the usual approved pressure operated diaphram type which can be purchased on the open market, and their diaphragms (not shown) which are contained in the housings 39 are actuated in accordance with the quantity of water in the storage chamber 23 through a level variance pressure transmitting device 40, (of any approved type which can be purchased upon the open market) so that as the load on the apparatus decreases (that is as the demand for treated water falls) and the level of water in the chamber 23 rises to a predetermined height, the valve 37 will be closed, in proportion to the rise of water level in the chamber 23, and the valve 38 will be opened in proportion to the closing of the valve 37, thus providing a constant quantity flow of water through the mixing chamber 4, settling chamber 16 and floc bed 17. This constant quantity flow of water is maintained because as the quantity of raw water to the apparatus is decreased by the closing of the valve 37, the quantity of treated water is increased a like amount by the opening of the valve 38 As the demand for treated water increases the valves 37 will be opened in accordance with the demand and the valve 38 will be closed, thus a constant quantity upflow of water through the floc bed 17 is maintained by complementary recirculation of treated water.

Pressure actuated valves 41 and 42 (which are of any approved type which may be purchased upon the open market) are provided to maintain constant pressure of water across the valves 37 and 38 respectively. These valves 41 and 42 are operated by pressure differences in the pipes 3 and 35 respectively, upon opposite sides of the valves 37 and 38 as clearly shown in Figure 1 of the drawings.

The utilization of an adsorptive floc bed in a hot process deaerating water treating apparatus tends to decrease the retention time for the water in the apparatus, and for the purpose of further accelerating precipitation of foreign matter into floc with a consequent reduction in retention time of the water in the apparatus, means are provided to recirculate some of the prepicitated floc through the mixing chamber 4 and settling chamber 16. To provide such recirculation of floc, a pipe 43 connects with the settling chamber 16 a short distance below the top or most concentrated part of the floc bed, and this pipe 43 communicates with the suction of the recirculating pump 34, so that the pump will pick up floc from the chamber 16 and deliver it to the top of the mixing chamber 4, through the ring 6 and nozzles 7. A valve 44 is provided in the pipe 43 to provide manual control of the recirculation of floc, and a valve 45 may be provided in the pipe 33 to permit manual control of recirculation of treated water, if desired.

What is claimed is:

1. The method of degasifying and purifying water which consists in spraying the raw water to be treated through a steam containing space to partially heat the water, delivering the partially heated water into a reaction chamber, spraying chemicals through the steam containing space, imparting vigorous rotation to the water in the reaction chamber whereby the water and chemicals sprayed through the steam containing space will be thoroughly mixed, passing the water and precipitated floc from the reaction chamber in a plurality of lateral and upwardly flowing arcuate rotative streams, passing the upwardly flowing water through a bed of floc precipitated from the water, to filter out the precipitated foreign matter, passing the treated purified water together with incoming steam in the same direction through a confined passage to thoroughly mix the steam and water, delivering the stream of mixed steam and water into an area of lower pressure than in the confined passage to separate out released gases, and finally delivering the heated treated degasified water into a storage compartment.

2. The method of degasifying the purifying water which consists in spraying the raw water to be treated through a steam containing space to partially heat the water, delivering the partially heated water into a reaction chamber, spraying chemicals through the steam containing space, imparting vigorous rotation to the water in the reaction chamber whereby the water and chemicals sprayed through the steam containing space will be thoroughly mixed, passing the water and precipitated floc from the reaction chamber in a plurality of lateral and upwardly flowing arcuate rotative streams, passing the upwardly flowing water through a bed of floc precipitated from the water, to filter out the precipitated foreign matter, passing the treated purified water together with incoming steam in the same direction through a confined passage to thoroughly mix the steam and water, delivering the stream of mixed steam and water into an area of lower pressure than in the confined passage to separate out released gases, and finally delivering the heated treated degasified water into a storage compartment, delivering uncondensed steam and released gases from said area of lower pressure to said steam containing space for contact with incoming raw water, and finally delivering residue steam and released gases from the steam containing space to a condenser.

3. The method of degasifying and purifying water which consists in spraying the raw water to be treated through a steam containing space to partially heat the water, delivering the partially heated water into a reaction chamber, spraying chemicals through the steam containing space, imparting vigorous rotation to the water in the reaction chamber whereby the water and chemicals sprayed through the steam containing space will be thoroughly mixed, passing the water and precipitated floc from the reaction chamber in a plurality of lateral and upward'y flowing arcuate rotative streams, passing the upwardly flowing water through a bed of floc precipitated from the water to filter out the precipitated foreign matter, passing the treated purified water together with incoming steam in the same direction through a confined passage to thoroughly mix the steam and water, delivering the stream of mixed steam and water into an area of lower pressure than in the confined passage to separate out released gases, and finally delivering the heated treated degasified water into a storage compartment, delivering uncondensed steam and released gases from said area of lower pressure to said steam containing space for contact with incoming raw water and finally delivering residue steam and released gases from the steam containing space to a condenser, pass'ng the raw water prior to its entrance into the steam containing compartment through said condenser and utilizing the steam and released gases in the condenser to initially heat the raw water.

4. The method of degasifying and purifying water which consists in spraying the raw water to be treated through a steam containing space to partially heat the water, delivering the partially heated water into a reaction chamber, spraying chemicals through the steam containing space, imparting vigorous rotation to the water in the reaction chamber whereby the water and chemicals sprayed through the steam containing space will be thoroughly mixed, passing the water and precipitated floc from the reaction chamber in a plurality of lateral and upwardly flowing arcuate rotative streams, passing the upwardly flowing water through a bed of floc precipitated from the water to filter out the precipitated foreign matter, passing the treated purified water together with incoming steam in the same direction through a confined passage to separate out released gases, and finally delivering the heated treated degasified water into a storage compartment, and increasing the velocity of flow of the partially treated water immediately prior its conversion into the lateral and upwardly flowing rotative streams.

5. The method of degasifying and purifying water which consists in spraying the raw water to be treated through a steam containing space to partially heat the water delivering the partially heated water into a reaction chamber, spraying chemicals through the steam containing space, imparting vigorous rotation to the water in the reaction chamber whereby the water and chemicals sprayed through the steam containing space will be thoroughly mixed, passing the water and precipitated floc from the reaction chamber in a plurality of lateral and upwardly flowing arcuate rotative streams, passing the upwardly flowing water through a bed of floc precipitated from the water to filter out the precipitated foreign matter, passing the treated purified water together with incoming steam in the same direction through a confined passage to thoroughly mix the steam and water, delivering the stream of mixed steam and water into an area of lower pressure than in the confined passage to separate out released gases, finally delivering the heated treated degasified water into a storage compartment, and maintaining a constant quantity flow of water through the reaction and separation chambers by recirculating a part of the treated water with the incoming raw water.

6. The method of degasifying and purifying water which consists in spraying the raw water to be treated through a steam containing space to partially heat the water, delivering the partially heated water into a reaction chamber, spraying chemicals through the steam containing space imparting vigorous rotation to the water in the reaction chamber whereby the water and chemicals sprayed through the steam containing space will be thoroughly mixed, passing the water and precipitated floc from the reaction chamber in a plurality of lateral and upwardly flowing arcuate rotative streams, passing the upwardly flowing water through a bed of floc precipitated from the water to filter out the precipitated foreign matter, passing the treated purified water through with incoming steam in the same direction through a confined passage to separate out released gases, and finally delivering the heated treated degasified water into a storage compartment, and increasing the velocity of flow of the partially treated water immediately prior its conversion into the lateral and upwardly flowing rotative stream, and maintaining a constant quantity flow of water through the reaction and filtering flows by recirculating a part of the treated water with the incoming raw water.

7. The method of degasifying and purifying water which consists in spraying the raw water to be treated through a steam containing space to partially heat the water, delivering the partially heated water into a reaction chamber, spraying chemicals through the steam containing space, imparting vigorous rotation to the water in the reaction chamber whereby the water and chemicals sprayed through the steam containing space will be thoroughly mixed, passing the water and precipitated floc from the reaction chamber in a plurality of lateral and upwardly flowing arcuate rotative streams, passing the upwardly flowing water through a bed of floc precipitated from the water to filter out the precipitated foreign matter, passing the treated purified water together with incoming steam in the same direction through a confined passage to thoroughly mix the steam and water, delivering the steam of mixed steam and water into an area of lower pressure than in the confined passage to separate out released gases, delivering the heated treated degasified water into a storage compartment, delivering uncondensed steam and released gases from said area of lower pressure to said steam containing space for contact with incoming raw water, finally delivering residue steam and released gases from the steam containing space to a condenser, and increasing the velocity of flow of the partially treated water immediately prior to its conversion into the lateral and upwardly flowing rotative streams.

8. In a hot process treating apparatus for purifying, heating and degasifying water, a receptacle having a mixing chamber, a separation chamber and a storage space for treated water therein, means for spraying water to be treated into said mixing chamber, means for delivering treated chemicals to said mixing chamber, a steam inlet to said receptacle for admitting steam for contact with the water being sprayed into the mixing chamber for initially heating the water, said mixing chamber having communication with said separation chamber to deliver partially treated water to the separation chamber, and a plurality of arcuate vanes between the mixing chamber and the settling chamber to impart rotative movement to the partially treated water as it enters the mixing chamber.

9. In a hot process treating apparatus for purifying, heating and degasifying water, a receptacle having a mixing chamber, a separation chamber and a storage space for treated water therein, means for spraying water to be treated into said mixing chamber, means for delivering treated chemicals to said mixing chamber, a steam inlet to said receptacle for admitting steam for contact with the water being sprayed into the mixing chamber for initially heating the water, said mixing chamber having communication with said separation chamber to deliver partially treated water to the separation chamber, a plurality of arcuate vanes between the mixing chamber and the settling chamber to impart rotative movement to the partially treated water as it enters the mixing chamber, and means for increasing the velocity of flow of the partially treated water immediately prior to its engagement with said arcuate vanes.

10. In a hot process treating apparatus for purifying, heating, and degasifying water, a receptacle having a mixing chamber, a separation chamber, and a storage space for treated water therein, means for spraying water to be treated into said mixing chamber, means for delivering treating chemicals to said mixing chamber, a steam inlet to said receptacle for admitting steam for contact with water being sprayed into said mixing chamber for initially heating the water, said mixing chamber having communication with said separation chamber to deliver partially treated water to the separation chamber, and a plurality of arcuate vanes between the mixing chamber and the settling chamber to impart rotative movement to the partially treated water as it enters the mixing chamber, a floc bed in said separation chamber, and means for recirculating treated water from a point in said mixing chamber above said floc bed back to the means for spraying water to be treated into the mixing chamber, and pressure actuated means for controlling the proportionate quantities of raw water and recirculated water delivered to said water spraying means.

11. In a hot process treating apparatus for softening, heating and degasifying water, a treating receptacle, a cylindrical wall extending longitudinally through the major length of said receptacle and forming a mixing chamber within the wall and a separation chamber exteriorly of the wall, means for spraying water to be treated into said mixing chamber, means for delivering water heating steam into contact with water being sprayed into said mixing chamber, means for delivering treating chemicals into said mixing chamber, said cylindrical wall terminating short of the wall of the receptacle to form a space of communication between the mixing chamber and the separation chamber, a plurality of arcuate baffles in said space to impart rotative movement to the water entering the separation chamber, said receptacle provided with a storage chamber for treated water, recirculating means for taking treated water from said separation chamber and delivering it to said water spraying means for recirculation through the mixing and separation chambers.

12. In a hot process treating apparatus for softening, heating and degasifying water, a treating receptacle, a cylindrical wall extending longitudinally through the major length of said receptacle and forming a mixing chamber within the wall and a separation chamber exteriorly of the wall, means for spraying water to be treated into said mixing chamber means for delivering water heating steam into contact with the water being sprayed into the mixing chamber, means for delivering treating chemicals into said mixing chamber, said cylindrical wall terminating short of the wall of the receptacle to form a space of communication between the mixing chamber and the separation chamber, a plurality of arcuate baffles in said space to impart rotative movement to the water entering the separation chamber, said receptacle provided with a storage chamber for treated water, recirculating means for taking treated water from said separation chamber and delivering it to said water spraying means for recirculation through the mixing and separation chambers, and pressure actuated means for controlling the quantity of treated water recirculated by said recirculating means.

13. In a hot process treating apparatus for softening, heating and degasifying water, a treating receptacle, a cylindrical wall extending longitudinally through the major length of said receptacle and forming a mixing chamber within the wall and a separation chamber exteriorly of the wall, means for spraying water to be treated into said mixing chamber means for delivering water heating steam into contact with the water being sprayed into said mixing chamber means for delivering treating chemicals into said mixing chamber, said cylindrical wall terminating short of the wall of the receptacle to form a space of communication between the mixing chamber and the separation chamber, a plurality of arcuate baffles in said space to impart rotative movement to the water entering the separation chamber, said receptacle provided with a storage chamber for treated water, recirculating means for taking treated water from said separation chamber and delivering it to said water spraying means for recirculation through the mixing and separation chambers, said receptacle provided with a storage space for treated water, and means connected with said recirculating means for delivering mixed water and precipitated floc from said separation chamber to the recirculating means for delivery to said water spraying means.

14. In a hot process treating apparatus for softening, heating and degasifying water, a treating receptacle, a cylindrical wall extending longitudinally through the major length of said receptacle and forming a mixing chamber within the wall and a separation chamber exteriorly of the wall, means for spraying water to be treated into said mixing chamber, means for delivering treating chemicals into said mixing chamber, said receptacle provided with an inlet for steam, means for directing steam from said steam inlet into contact with water being sprayed into said mixing chamber, said cylindrical wall terminating short of the wall of said receptacle to form a space of communication between said mixing chamber and said settling chamber, a plurality of arcuate baffles in said space to impart rotative movement to the water entering the separation chamber, floc removal means opening into said receptacle intermediate the top and bottom of said separating chamber for regulating the level of precipitated floc in the separating chamber and forming a softened water containing space in said separation chamber, a partition in said receptacle forming a storage chamber for treated water, means for leading water from the part of said mixing space above the level of the precipitated floc into said storage water space, and means for directing steam from said steam inlet into mixing contact with water passing from said mixing chamber into said storage chamber.

15. A hot process treating apparatus for softening, heating and degasifying water as claimed in claim 14 wherein said last named steam directing means comprises baffles forming a passage having restricted openings for receiving steam and water which restricted passages communicate with each other at their outlets and open into said storage chamber whereby incoming steam will impart an inductive action to the water.

16. A hot process treating apparatus for softening, heating and degasifying water as claimed in claim 14 including an inclined wall at the bottom outlet of said mixing chamber and extending to the entrance edges of said arcuate baffles to gradually restrict the cross sectional area of the mixing chamber to increase the velocity of the mixture of water and chemicals as it is engaged by said arcuate baffles.

17. A hot process treating apparatus for softening, heating and degasifying water as claimed in claim 14 including a collection ring about said circular partition at the top of said separation chamber and provided with openings to permit entrance of water from the separation chamber into the ring, and means for delivering water from said ring into the inlet of said mixing chamber.

18. A hot process treating apparatus for softening, heating and degasifying water as claimed in claim 14 including a collection ring about said circular partition at the top of said separation chamber and provided with openings to permit entrance of water from the separation chamber into the ring, means for delivering water from said ring into the inlet of said mixing chamber, and pressure actuated means operated by pressure of water in the treated water storage chamber for controlling the delivery of water from said ring to said mixing chamber.

19. A hot process treating apparatus for softening, heating and degasifying water as claimed in claim 14 including an inclined wall at the bottom outlet of said mixing chamber and extending to the entrance edges of said arcuate baffles to gradually restrict the cross sectional area of the mixing chamber to increase the velocity of the mixture of water and chemicals as it is engaged by said arcuate baffles, a collection ring about said circular partition at the top of said separation chamber and provided with openings to permit entrance of water from the separation chamber into the ring, means for delivering water from said ring into the inlet of said mixing chamber, and pressure actuated means operated by pressure of water in the treated water storage chamber for controlling the delivery of water from said ring to said mixing chamber.

20. A hot process treating apparatus for softening, heating and degasifying water as claimed in claim 14 wherein said last named steam directing means comprises baffles forming a passage having restricted openings for receiving steam and water which restricted passages communicate with each other at their outlets and open into said storage chamber whereby incoming steam will impart an inductive action to the water, a collection ring about said circular partition at the top of said separation chamber and provided with openings to permit entrance of water from the separation chamber into the ring, means for delivering water from said ring into the inlet of said mixing chamber, and pressure actuated means operated by pressure of water in the treated water storage chamber for controlling the delivery of water from said ring to said mixing chamber.

JOSEPH F. SEBALD.

REFERENCES CITED

The following references are of record in the file of this patent:

UNITED STATES PATENTS

| Number | Name | Date |
|---|---|---|
| 2,160,832 | Contant | June 6, 1939 |
| 2,223,892 | Lawlor | Dec. 3, 1940 |
| 2,245,587 | Hughes | June 17, 1941 |
| 2,355,561 | Robinson | Aug. 8, 1944 |
| 2,378,799 | Sebald | June 19, 1945 |
| 2,379,753 | Sebald | July 3, 1945 |
| 2,382,490 | Lawlor | Aug. 14, 1945 |
| 2,383,086 | Sebald | Aug. 21, 1945 |
| 2,427,422 | Sebald | Sept. 16, 1947 |